United States Patent Office 3,566,483
Patented Mar. 2, 1971

3,566,483
EDUCATIONAL APPARATUS
Solomon Axelrod, New York, N.Y.
(28 Metropolitan Oval, Parkchester, Bronx, N.Y. 10462)
Filed Jan. 23, 1969, Ser. No. 793,402
Int. Cl. G09b *19/08*
U.S. Cl. 35—35
4 Claims

ABSTRACT OF THE DISCLOSURE

Educational apparatus in the form of a card having a front element with a viewing opening and a rear element having first and second indicia spaced from each other a predetermined distance, said front and rear elements being interconnected for relative movement to a first position in which the first indicia is exposed through the viewing opening and to a second position in which the second indicia is exposed through the viewing opening.

---

This invention relates generally to educational apparatus and more particularly to structure of the class described which may be used for learning while playing and which may also be used to encourage the educational process by competition.

It is among the objects of the present invention to provide a multilayer card preferably composed of paper or cardboard which being capable of having the layers thereof shifted; at first submits a question in the form of a word in a basic language, challenging in effect the player-student to voice or otherwise designate the corresponding foreign word in the language being studied. Then the layers of the card are shifted in position with respect to each other and the correct foreign word previously concealed is displayed through an opening in the front element of the card to corroborate or correct the previous choice of the player-student.

Another object herein lies in the provision of structure of the class described which by the use of simple one or two piece constructions, with integral hinges, enables low cost, high quality construction whereby decks of fifty-two or more of such cards may have wide distribution and use.

A further object herein is the provision of sets of educational cards of the character described combined with means for competitive scoring to increase zeal in the educational process.

These objects and other incidental ends and advantages will more fully appear in the progress of this disclosure.

In the drawings in which similar reference characters designate corresponding parts in the several views:

FIG 1 is a front elevational view of a first embodiment of the invention, in a first position thereof.

FIG. 2 is a side elevational view of FIG. 1 as seen from the right side thereof.

FIG. 3 is a front elevational view, of the first embodiment but showing the device in a second position thereof.

FIG. 4 is a side elevational view of FIG. 3 as seen from the right thereof.

FIG. 5 is a front elevational view, comparable to FIG. 1, but showing a second embodiment of the invention.

FIG. 6 is a right side elevational view of FIG. 5.

FIG. 7 is a front elevational view, comparable to FIG. 3, but showing the second embodiment.

FIG. 8 is a right side elevational view of FIG. 7.

FIG. 9 is a front elevational view of a third embodiment.

FIG. 10 is a right side elevational view of FIG. 9.

FIG. 11 is a view, comparable to FIGS. 3 and 7, but showing the third embodiment of the invention.

FIG. 12 is a right side elevational view of FIG. 11.

FIG. 13 is a cross sectional view of a box and also letter blocks.

In accordance with the first embodiment of the invention, as illustrated in FIGS. 1 to 4 inclusive, the apparatus is in the form of a plurality of playing cards, such as a set of, for example, fifty-two cards having the usual card markings which are used for scoring. One of the cards, indicated by reference character 10, comprises generally: a front element 12, a rear element 14, an upper connecting portion 16, a lower connecting portion 18, an upper front hinge 20, a lower front hinge 22, an upper rear hinge 24 and a lower rear hinge 26.

The card 10 is formed from a single blank of suitable material such as paper, or light cardboard. The front element presents a panel having a top edge 28, a bottom edge 30, a left side edge 32, a right side edge 34, a front surface 36 upon which are imprinted the usual card markings 38, and a rear surface 40. The front element 12 has a viewing opening 42 in the upper portion thereof.

The rear element 14 presents a panel having a top edge 44, a bottom edge 46, a left side edge 48, a right side edge 50, a front surface 52 and a rear surface 54. The rear element 14 on the upper portion of the front surface 52 has first indicia 56, and on the lower portion of said front surface has second indicia 58.

Extending upward from the lower front hinge 22 is a tab 23 which is secured to the rear surface 40, for example adhesively.

One of the educational purposes for which the present invention may be used is in the teaching of a foreign language. Thus, for example, in the teaching of Spanish, a student may, in his turn from a group of students, select a card 10 at random from a stack of these cards. This discloses the word "man" through the viewing opening 42. Whereupon the student is called upon to speak out or otherwise indicate the correct Spanish translation. Assuming that he selects the word "hombre," elevating the rear element 14 will produce the display seen in FIG. 3, proving his selection to be correct. He will then be credited with whatever point scoring has been preset for the "three of diamonds." The procedure may continue for other students in their turn so that competitive inducement is provided for the rapid learning and advancement of the students. Because the learning process is enhanced by repetition and visual exposure, the student picks a number of small blocks 60 from a supply 62 in a tray or box 64 (FIG. 13), and spells out the word he has just learned or dealt with, placing the blocks in a row in the trough 66. The cross-sectional size and angularity of the trough 66 is such manner that when the blocks 60 are resting in the trough their center of gravity is within the trough and they stay where they have been placed by the student. After they have served their educational purpose, the student may, by running his finger along the projecting upper portion 68 quickly and easily flip them back and down into the pile which is the supply 62 referred to above. To facilitate the quick finding of the March 2, 1971     S. AXELROD     3,566,483
EDUCATIONAL APPARATUS
Filed Jan. 23, 1969
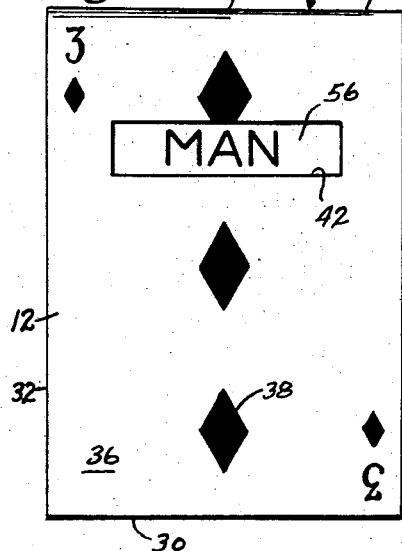
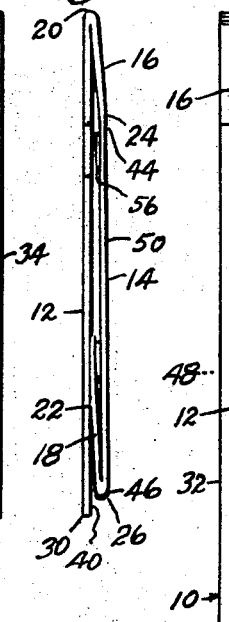
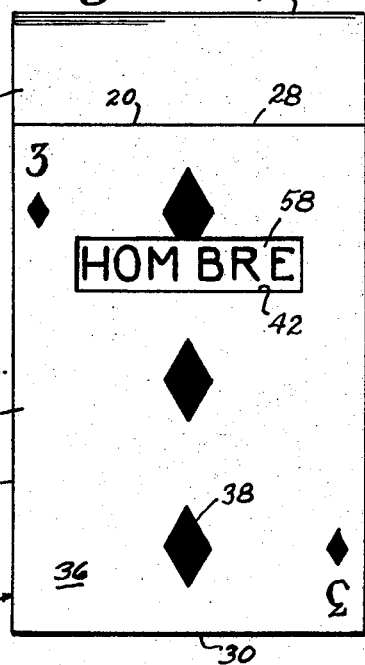
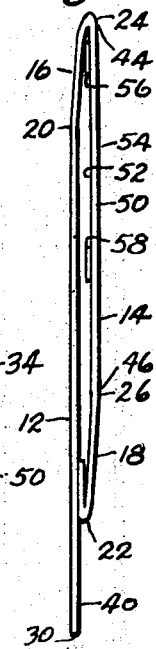
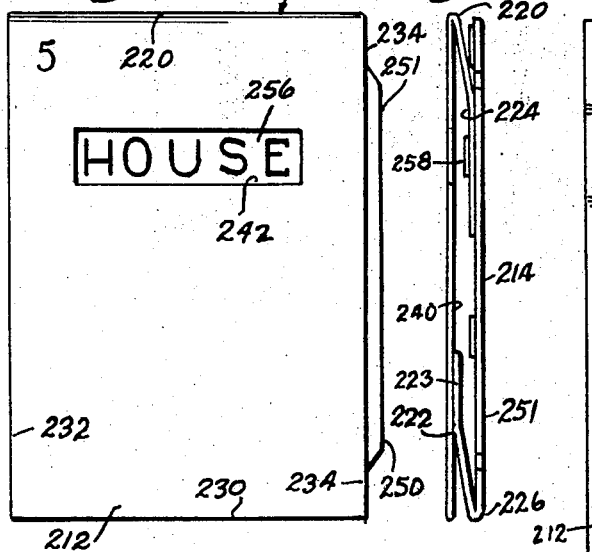
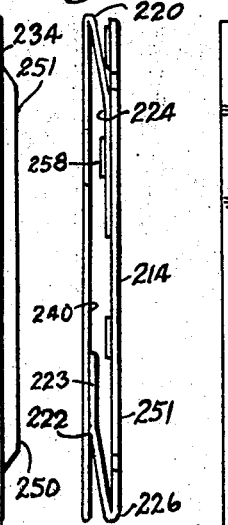
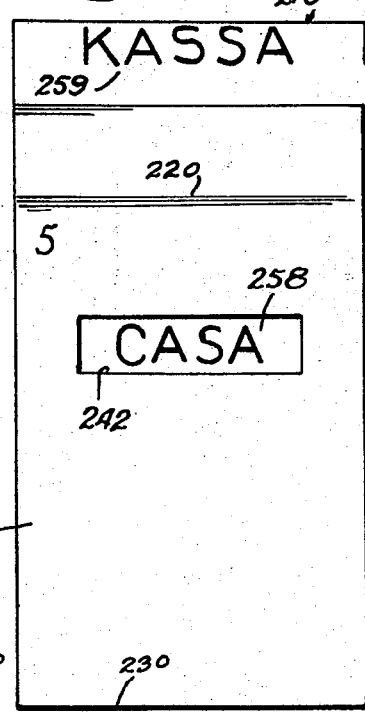
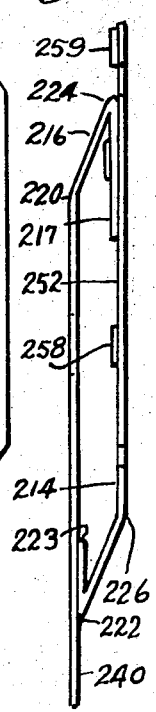
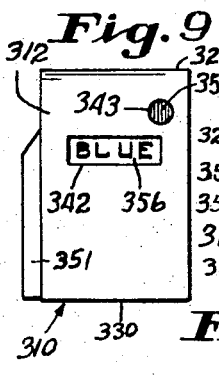
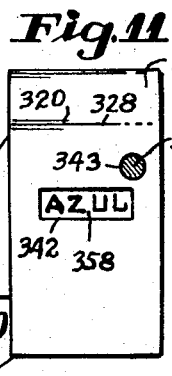
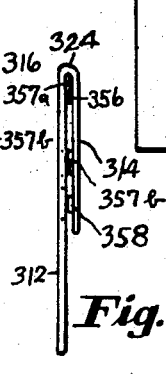
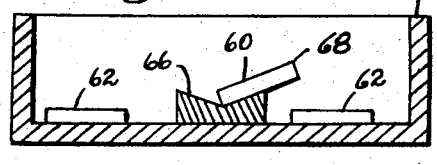

The card 10 is so constructed and arranged that when in its normal condition, the first indicia 56 is visible through the viewing opening 42 and the second indicia 58 is obscured by the lower portion of the front element 12; while, on the other hand, when the rear element 14 is elevated to the second position thereof, by partial rotation about the hinges 20, 22, 24 and 26, the first indicia 56 becomes concealed by the upper connecting portion 16 and the second indicia 58 comes into view through the viewing opening 42. This is the position of the parts shown in FIGS. 3 and 4 of the drawings.